Dec. 3, 1968

L. HAWORTH 3,413,872

DAMPING MEANS

Filed March 18, 1966

Inventor
LIONEL HAWORTH
By
Bailey, Stephens & Huettig
Attorneys

United States Patent Office 3,413,872
Patented Dec. 3, 1968

3,413,872
DAMPING MEANS
Lionel Haworth, Bristol, England, assignor to Bristol Siddeley Engines Limited, Bristol, England, a British company
Filed Mar. 18, 1966, Ser. No. 535,457
Claims priority, application Great Britain, Mar. 19, 1965, 11,863/65
5 Claims. (Cl. 74—574)

ABSTRACT OF THE DISCLOSURE

A machine, especially a rotary-bladed fluid-flow one, having as one of its components a hollow shaft which in use rotates at high speed and is subjected to a periodic force which might induce a resonant lobing in the shaft and hence cause damage, the shaft having one or more rigid members, preferably annular dished discs, mounted inside it at positions which substantially raise the lowest natural lobing frequency of the shaft to a value substantially greater than the frequency of the said periodic force, the lowest natural lobing frequency being calculated while taking account of the effect of the rotation of the shaft, the positions of the discs being preferably at or near antinodes of the natural lobing modes which can occur through the operating range of speeds of rotation of the shaft, and being caused by the said periodic force.

---

This invention relates to the stiffening of thin-walled elongated hollow shafts, e.g. a driving shaft connecting a turbine to a compressor in an axial flow gas turbine engine. Such a shaft may have an intermediate section of increased diameter lying between sections of smaller diameter supported in annular bearings. In operation this shaft may be subjected to a periodic force causing vibration. The form of vibration involves local flexing of the wall with radial vibratory motion of elements of the wall.

This vibratory motion may occur at one or more frequencies, which are the natural frequencies of the shaft. Each frequency corresponds to a different mode of vibration. In the modes there are at least two nodal lines extending axially, and there may be any number, from zero upwards, of nodal lines extending circumferentially. When the shafting is rotating, the axial nodal lines move round the shaft owing to the Coriolis effect, while the circumferential nodal lines (nodal circles) remain stationary. If the frequency of the applied forces is of a value such that a natural frequency of the shaft is excited, the induced vibration may attain very large amplitudes which if not checked may result in shaft fracture.

By means of this invention the lowest frequency, at which vibration within the shaft wall may take place, is raised by a factor of at least 1.5; a practical factor to design for is about five.

One possible remedy is to stiffen the shaft by increasing the wall thickness, but where weight considerations are important this may not be acceptable, as the increase in natural frequency with increase in wall thickness is not very great. In addition, increasing the wall thickness of the shaft may aggravate whirling problems. If alternatively the shaft is provided with external reinforcing ribs in order to raise the frequency, the rib size may be too great for practical purposes because of limitations on space arising from the surrounding structure.

According to the present invention, the shaft encloses a rigid member which tightly engages substantially the entire inner periphery of the shaft in a plane perpendicular to the axis of the shaft, the member being located at a position along the axis of the shaft which would lie, in the absence of the member, substantially at an antinode of a natural mode of vibration induced in the rotating shaft by the said periodic force. The stiffening member may be located away from an antinode provided that it is not located at a nodal circle or so near thereto to be ineffective for practical purposes.

By way of example the invention will now be described with reference to the accompanying drawings in which FIGURES 1 and 2 are diagrammatic end and side views respectively of a rotating shaft which is experiencing the circumferential form of vibration known sometimes as "lobing," the shaft distortion being exaggerated.

Figure 1:
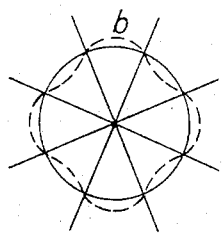
Figure 2:
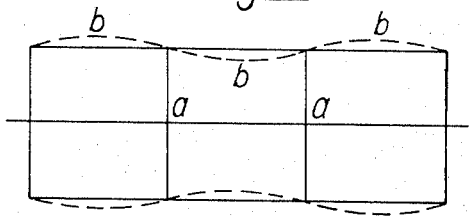

FIGURES 1 and 2 show the bending and stretching of a normally cylindrical shaft wall into a four-lobe shape, as indicated in dotted lines, which is a typical form of circumferential vibration at a natural frequency of the shaft. Under rotational conditions the vibration moves round relatively to the shaft. This movement is due to Coriolis acceleration effects arising from the radial vibration of the shaft wall. The two intermediate nodal circles, where amplitude of the radial vibration of elements of the wall is nil or least, are indicated by reference $a$. The antinodal circles where the amplitude is greatest are indicated at $b$. Further more, under rotating conditions there are two frequencies at which any given nodal shape can be excited to resonance. One frequency is higher and the other is lower than the corresponding static frequency of the shaft and both rotational frequencies are related to the rotational speed of the shaft.

Figure 3:
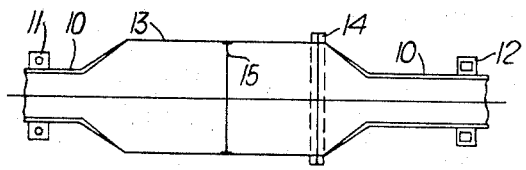
FIGURE 3 is a diagrammatic longitudinal section of a portion of a driving shaft provided with a single disc-like stiffening member.

In FIGURE 3 an engine shaft comprises end sections 10 freely supported on annular bearings 11, 12 and between them an intermediate cylindrical section 13 of enlarged diameter which includes an annular flanged joint 14, enabling the assembly to be taken apart to introduce the discs.

In operation of the engine, the circumstances may be such that a periodic pressure pulsation is applied to the shaft to cause the latter to vibrate. If the pressure pulsation frequency excites a natural frequency of the shaft, resonance will occur and the shaft may fracture. The end sections 10 which are of relatively smaller diameter and greater wall thickness than the intermediate section 13 are much less likely to fracture, since the amplitude of any vibration at these stations is bound to be much smaller than that in the central portion. Stiffening means are provided internally in the shaft section 13 to raise the lowest natural frequency of the shaft to a frequency which is sufficiently high to avoid resonance under operating conditions. The required increase in shaft frequency is achieved by means of this invention by locating a disc-like stiffening member 15 within the shaft at its central antinodal station $b$ which then becomes an imposed nodal circle under the restriction imposed on it by the stiffening member.

Figure 4:
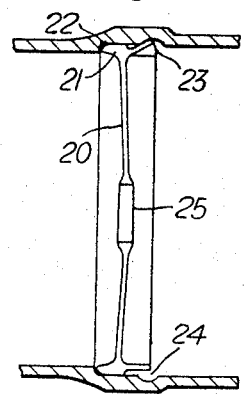
FIGURE 4 is a section on a larger scale of the stiffening member of FIGURE 3.

Referring to FIGURE 4 the stiffening member 15 consists of a disc 20 provided with a double flanged rim 21 one flange of which abuts a shoulder 22 formed in the internal surface of the shaft wall 13 whilst the other flange is deformed outwards at three circumferential spaced locations 23 to engage in an annular groove 24 cut in the adjacent surface of the shaft wall. The member 15 is thus prevented from moving axially in either direction so that it remains in position at its predetermined station. The disc 20 is of dished form to facilitate removal for inspection purposes. This disc may be provided with a central hole 25 to ease removal and for such purposes as weight saving, equalising air pressure along the shaft, or permitting fluid flow through the shaft.

The number 15 is given a shrink fit within the shaft so as to minimise any slight circumferential and possibly other relative movement between the interfaces of the two rotating members. Any slight relative movements which do exist allow the member 15 to function in the manner of a friction damper to reduce shaft vibration.

Figure 5:
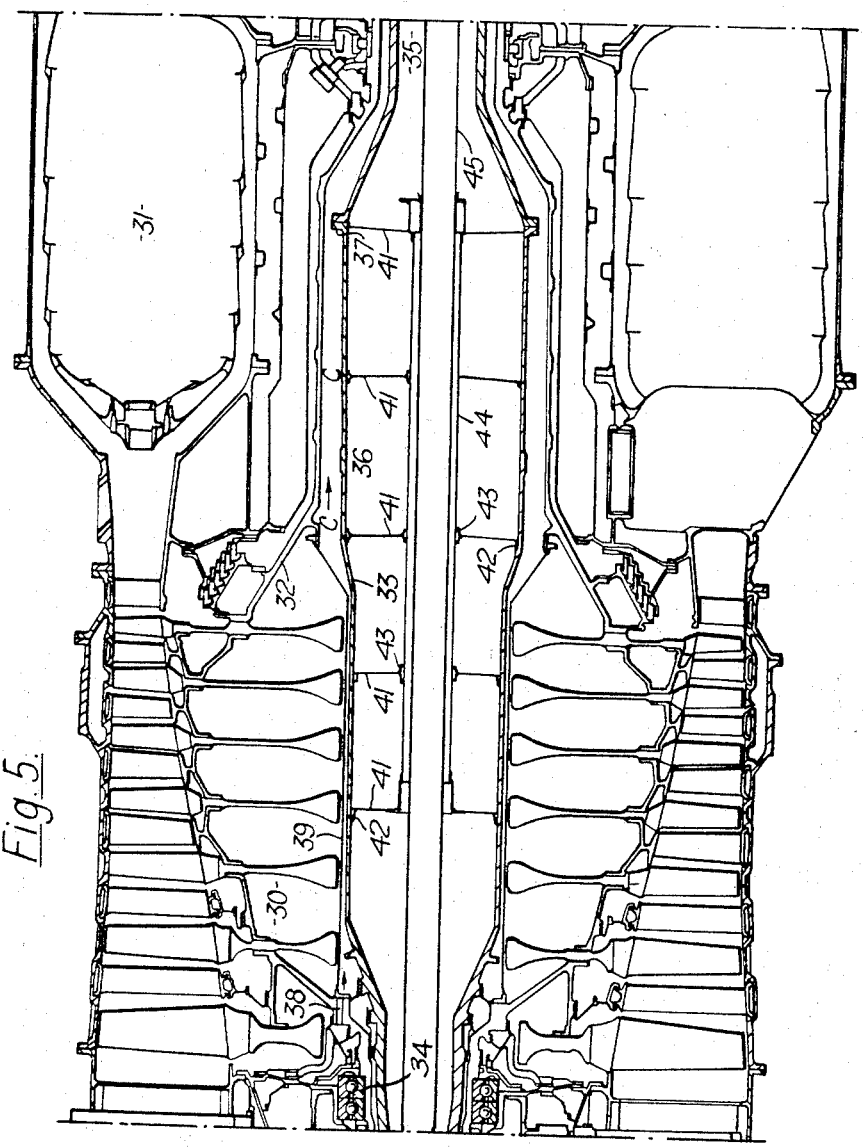
FIGURE 5 is a longitudinal section through a portion of an axial flow gas turbine engine having concentric driving shafts, the inner of which is provided with a number of axially spaced disc-like stiffening members.

Referring to FIGURE 5, the gas turbine engine (of which only a portion is shown) comprises in flow sequence a L.P. (low pressure) compressor, a H.P. (high pressure) compressor 30, a combustion system 31, a H.P. turbine and a L.P. turbine. The H.P. turbine drives the H.P. compressor 30 through the outer of two concentric shafts 32 and 33 while the L.P. turbine drives the L.P. compressor through the inner shaft 33. Both shafts are supported on annular bearings near their respective ends, the inner shaft 33 being additionally supported on bearings 34 located near a shaft coupling between the two compressors. The shaft 33 has a downstream end section 35 and an intermediate section 36 of circular section the downstream end of which is flanged and bolted at 37 to the section 35. It will be seen that the intermediate section 36 is of larger diameter and less wall thickness than the end section 35; the natural frequencies in the circumferential modes of section 36 are therefore much lower than those of section 35. In this engine compressed air is tapped from the delivery of the L.P. compressor and passed rearwards along the outside of the shaft 33 to reach and cool the turbine system. The cooling air is passed through an annular series of circumferentially-spaced passages 38 formed in a frusto-conical front support member of the H.P. compressor 30, to reach a narrow annular duct bounded by the shaft 33 and by a sleeve 39 masking the hubs of the H.P. compressor discs, as indicated by the arrows.

It has been found in engines of this kind that pressure fluctuations within the air duct defined by the shaft 33 and the sleeve 39, has induced lobing in the thin-walled large diameter intermediate section 36. A possible source of the periodic air pulsations may be, basically, self-excited resonances of the air cavities between the compressor discs, but in this embodiment shaft excitation by pulsations from such a source is avoided by the masking effect of sleeve 39 which is extended at its downstream end to engage a flange on the outer shaft 32. However, other pulsations arise from the air jets formed by the streams of the turbine cooling air through the passages 38.

By introducing a number of disc-like stiffening members 41 along the section 36 it has been found that the lowest natural frequency has been raised above those air excitation frequencies which are likely to cause large amplitudes of vibration during operation of the engine.

The stiffening members 41 have flanges 42, 43 at their rims and hubs respectively and are of slightly dished shape to facilitate removal.

The method of calculating the optimum position for the stiffening discs is outlined below. It consists generally of calculating which of the natural frequencies of the rotating shaft are likely to be excited by the applied frequencies, and then positioning the discs at one or more antinodes of the modes of vibration having those frequencies.

The frequency equation can be simplified to $$\Delta = \frac{K_0}{K_1}$$

$$f = \frac{1}{2\pi a}\sqrt{\frac{Eg\Delta}{\rho(1-\theta^2)}}$$

where $$K_0 = 0.325\lambda^4 + 0.355\beta(\lambda^2+n^2)^4 - 8\lambda^2 n^4 - 2n^6 + n^4$$

and $$K_1 = 0.355(\lambda^2+n^2)^2 + 1.271\lambda^2 + 0.355n^2 + 1.355\beta \times (\lambda^2+n^2)^3$$

where Poisson's ratio has been assumed to be 0.29 and $$\lambda = \frac{m\pi a}{l} \text{ and } \beta = \frac{h^2}{12a^2}$$

$(m+1)$ is the number of circumferential modes, (for no-circle mode $m=1$; for 1-circle mode $m=2$; etc.)

$\Delta$ = frequency parameter
$l$ = length of cylinder or shaft
$f$ = natural frequency
$h$ = wall thickness
$E$ = Young's modulus
$n$ = number of nodal diameters
$a$ = mean radius of cylinder or shaft
$g$ = gravitational constant
$\rho$ = density From this can be derived the static natural frequencies of the shaft.

Having calculated a sufficient number of frequencies for the lowest modes of vibration, the next step is to consider how these frequencies are modified when the shaft is rotated.

Under rotational conditions, the original static frequency is found to give rise to two "rotational natural frequencies," which diverge from one another as the rotational speed is increased. A transducer on the shaft will detect them as two distinct frequencies which for convenience can be termed $f1$ and $f2$.

A stationary observer will however detect them as $f1+n\Omega$ and $f2-n\Omega$ where $\Omega$ is the rotational speed in revolutions per second and $n$ is the number of nodal diameters. To calculate these rotational natural frequencies the following formula is used:

$$W_n^2 = f^2 + \left[\frac{n^2(n^2-3)}{n^2+1} + \frac{8n^2}{(n^2+1)^2}\right]\Omega^2 \pm \sqrt{\frac{8n^2\Omega^2}{(n^2+1)^2}\left[2f^2 + \frac{2n^2\Omega^2(n^2-3)}{n^2+1} + \frac{8n^2\Omega^2}{(n^2+1)^2}\right]}$$

where the only term not defined above is $W_n$ which is the value of the rotational natural frequencies.

It will be noted that there are no terms involving the number of circumferential nodes in the above expression; this is because they have no effect on the rotational frequencies other than to define the mode.

From a consideration of the engine geometry it is possible that there will be certain clear sources of excitation, and in addition to these, experience has shown on gas turbines that the most serious are pulsations which normally occur at frequencies below 1,000 c.p.s. (cycles per second). Consequently the aim is normally to ensure that none of the rotational natural frequencies occur below 1,000 c.p.s., which in practice may mean that all modes with static natural frequencies below 1,500 to 2,000 c.p.s. would have to be excluded. In the following description the modes of vibration are denoted by the number (n) of nodal diameters (D) combined with the number (m+1) of circumferential modes (C). For example, a 2D/0C mode has two nodal diameters, i.e., two lobes, and no circumferential nodes, except those at the end supports of the shaft.

Referring then to the static frequencies below 1,500 c.ps. to 2,000 c.p.s., this may include the 2D/0C; 2D/1C; 2D/2C; 2D/3C; 3D/0C; 3D/1C and 4D/0C modes depending on the design of shaft. To achieve this increase in frequency without a major redesign of the shaft or increasing its weight appreciably, stiffening discs are fitted.

The location of the stiffening discs is automatically decided by the decision previously made of which modes are to be excluded or raised in frequency.

Normally at least two discs would be required to exclude the one-circle (1C) modes, and these would be positioned at the antinode of this mode.

In the example considered above, it would be desirable to exclude the 2D/3C mode and so it would be necessary to fit four discs. These would be fitted at the antinodes of the 3C mode.

To calculate the new frequencies of the shaft fitted with discs, it is necessary to consider the effective length of the shaft to be the distance between successive discs, and use the same calculation outlined above.

The members 41 and the tube 44 (which are of different materials with different coefficients of expansion) are heated together, the members are threaded on to the tube 44 to take up their marked positions thereon and are then brazed in position, the arrangement being such that as the components cool the members form a shrink fit on the tube. With the section 35 not yet in position, the tube 44 carrying the spaced members 41 is inserted into position in the shaft section 36 which has just been heated so as to expand to receive the members 41. The shaft section 36 cools and shrinks on to the flanged rims 42 of the member 41. Alternatively or in addition to heating the shaft, the members 41 may be cooled below room temperature before insertion into the shaft. In either manner, each of the members 41 is located correctly at its selected antinodal station $c$ to impose the required nodal circle on the shaft vibration in question. An inner tube 45 which is provided for reasons unconnected with this invention and which has to be able to rotate is then inserted into the shaft and passed through the tube 44 as shown in FIGURE 5.

*Example*

The steel L.P turbine shaft of an axial flow gas turbine engine had an enlarged intermediate section of eight inches external diameter, was three feet long and had a thin general wall thickness of 0.150 inch. This section was fitted with four disc-like stiffening members located in a manner taught by the present invention. As a result the lower of the two rotational frequencies corresponding to the lowest natural frequency of vibration of the section was raised from 200 c.p.s. to 2,000 c.p.s.

I claim:
1. A machine including a hollow shaft which is mounted for rotation about its longitudinal axis, a means for rotating the shaft at speeds within a predetermined range, a means operative to apply to the shaft a periodic force, there being a speed within the said predetermined range at which the frequency of the applied periodic force at least approximately equals at least one of the natural lobing frequencies of the shaft, the shaft being provided internally with at least one rigid member which engages the interior of the shaft at a plurality of points in a plane perpendicular to the shaft axis, the member being located at a substantial distance from a node of the mode of lobing corresponding to the said natural frequency.

2. A machine as claimed in claim 1, which is of the rotary-bladed fluid-flow type and in which the applied periodic force arises from air pulsations impinging on the shaft.

3. A machine as claimed in claim 1, in which the shaft is supported in bearings at its ends, the ends having thick walls and being of small diameter, the length of the shaft between the ends having thin walls and being of large diameter.

4. A machine as claimed in claim 1, in which the rigid member is annular and slightly dished in form.

5. A machine as claimed in claim 1, in which the member is annular and has a shrink-fit engagement within the shaft.

References Cited

UNITED STATES PATENTS

| 2,277,186 | 3/1942 | Thege | 74—574 X |
| 2,652,700 | 9/1953 | Seibel | 74—574 X |
| 2,722,138 | 11/1955 | Neher | 74—574 |
| 2,729,518 | 1/1956 | O'Connor. | |

FOREIGN PATENTS

| 624,384 | 6/1949 | Great Britain. |
| 1,262,533 | 4/1961 | France. |

FRED C. MATTERN, Jr., *Primary Examiner.*

F. D. SHOEMAKER, *Assistant Examiner.*